United States Patent [19]

Murakami et al.

[11] Patent Number: 5,184,245
[45] Date of Patent: Feb. 2, 1993

[54] OPTICAL SCANNING SYSTEM

[75] Inventors: Kazunori Murakami; Tomonori Ikumi; Yasuo Matsumoto, all of Shizuoka; Yasuo Iwafune, Tokyo, all of Japan

[73] Assignee: Tokyo Electric Co., Ltd., Tokyo, Japan

[21] Appl. No.: 680,132

[22] Filed: Apr. 3, 1991

[30] Foreign Application Priority Data

Apr. 3, 1990 [JP] Japan .................................. 2-88448
Jul. 10, 1990 [JP] Japan ............................: 2-73192[U]

[51] Int. Cl.$^5$ ............................................ G02B 26/08
[52] U.S. Cl. .................................... 359/196; 359/211; 359/220; 310/90; 384/100
[58] Field of Search ............... 359/196, 197, 200, 209, 359/211, 220, 210, 212, 216, 217, 218, 219; 250/234, 235, 236; 356/138; 384/91, 100; 310/90, 103

[56] References Cited

U.S. PATENT DOCUMENTS

| | | |
|---|---|---|
| 3,093,736 | 6/1963 | McLaughlin et al. |
| 3,532,037 | 10/1970 | Aupnan et al. ...................... 359/220 |
| 3,588,249 | 6/1971 | Studebaker ......................... 359/196 |
| 3,961,838 | 6/1976 | Zanoni .............................. 359/221 |
| 4,010,361 | 3/1977 | Latterman et al. .................. 362/324 |
| 4,573,807 | 3/1986 | Asada et al. ....................... 384/100 |
| 4,699,447 | 10/1987 | Howard ............................. 359/220 |
| 4,701,651 | 10/1987 | Tanaka .............................. 310/90 |
| 4,836,631 | 6/1989 | Shimizu et al. ..................... 359/218 |
| 4,851,731 | 7/1989 | Saotome et al. ..................... 310/90 |

FOREIGN PATENT DOCUMENTS

| | | |
|---|---|---|
| 2449259 | 4/1975 | Fed. Rep. of Germany . |
| 239211 | 10/1986 | Japan .................................. 359/220 |
| 62-94814 | 5/1987 | Japan .................................. 359/200 |
| 62-138823 | 6/1987 | Japan . |
| 62-257119 | 11/1987 | Japan . |
| 1-283512 | 11/1989 | Japan . |

Primary Examiner—Loha Ben
Attorney, Agent, or Firm—Oblon, Spivak, McClelland, Maier & Neustadt

[57] ABSTRACT

An optical scanning system is constructed in a compact construction by attaching a light deflecting member to one end of the output shaft of a motor internally having a space for containing parts, forming an optical path extending through the space in the output shaft of the motor between a semiconductor laser and the light deflecting member, and providing at least a collimator lens in the space for containing parts. A meniscus lens, i.e., a correcting optical system, having a concave surface of a radius of curvature in the range of 8 to 20 mm is disposed with its concave surface facing the light deflecting member so that the distance between the reflecting point on the light deflecting member and the optical center of the concave surface is in the range of 5 to 10 mm to limit the curvatures of image field with respect to the scanning direction and with respect to the feed direction of the scanning light beam are limited to a very small degree. Thus, the optical scanning system has a simple, compact construction.

9 Claims, 7 Drawing Sheets

OPTICAL SCANNING SYSTEM

FIELD OF THE INVENTION AND RELATED ART STATEMENT

The present invention relates to an optical scanning system to be incorporated into an electrophotographic apparatus or a bar-code scanner.

Electrophotography capable of printing in a high print quality has recently been developed. Electrophotography employs an optical scanning system to form an image. The optical scanning system has a light deflecting member mounted on the output shaft of a motor and disposed on the passage of a light beam emitted by a light source, such as a semiconductor laser. The light reflecting member reflects the light beam on an image plane, such as a photoconductive surface or a surface marked with a bar code. A polygonal rotating mirror when used as the light deflecting member is capable of reflecting light beams by its plurality of reflecting surfaces at a high frequency. However, it is difficult to correct the inevitable difference in characteristics between the plurality of reflecting surfaces. Furthermore, it is difficult to construct the optical scanning system employing a polygonal rotating mirror in compact construction because optical parts including a semiconductor laser and a collimator lens must be arranged near the motor for rotating the polygonal rotating mirror.

FIGS. 10 and 11 show an optical scanning system incorporating improvements to solve those problems disclosed in Japanese Patent Laid-open No. 62-257119. Referring to FIGS. 10 and 11, this known optical scanning system 1 has a transparent member 2, i.e., a light deflecting member, attached to the output shaft of a motor, not shown. One end of the transparent member 2 is cut diagonally to form a reflecting surface 3 inclined at an angle of 45° to the axis of the transparent member 2. A portion of the circumference of the transparent member 2 extending at an acute angle, i.e., 45°, to the reflecting surface 3 is formed in a cylindroid surface 4. As shown in FIGS. 10 and 11, the center of rotation of the transparent member 2 is dislocated from the optical axis of a laser light source, not shown, for the layout of other parts and optical paths.

A scanning light beam traveling along the axis of the transparent member 2 falls on the reflecting surface 3 of the rotating transparent member 2, and the scanning light beam is reflected by the reflecting surface 3 for scanning. The scanning light beam reflected by the reflecting surface 3 is refracted at the cylindroid surface 4. Optical scanning systems employing a polygonal rotating mirror as a light deflecting member are classified into those of a postobjective type and those of a preobjective type. An optical scanning system employing a light deflecting member having a reflecting surface which receives a light beam along an optical path inclined to the center of rotation of the reflecting surface needs a correcting optical system because such an optical scanning system causes aberration, such as the curvature of image field. The optical scanning system 1 corrects the aberration of the scanning light beam reflected by the reflecting surface 3 by the refractive power of the cylindroid surface 4.

FIGS. 12 and 13 show another known optical scanning system disclosed in Japanese Patent Laid-open No. 1-283512. Referring to FIGS. 12 and 13, this known optical scanning system 5 employs a reflecting mirror 7, i.e., a light deflecting member, having a reflecting surface 6 inclined at an angle of 45° to its axis. The reflecting mirror 7 is attached to the output shaft of a motor 8. A tubular member 9 provided with a slit 10 in its circumference at a position corresponding to the reflecting surface 6 is attached to the upper surface of the motor 8 so as to enclose the reflecting mirror 7. A laser light source, not shown, is disposed on the axis of the motor 8 opposite to the upper open end of the tubular member 9.

A scanning light beam that falls on the reflecting mirror 7 along the axis of the reflecting mirror 7 is reflected by the reflecting surface 6 and travels through the slit 10 of the tubular member 9. The shape of the scanning light beam is shaped by the slit 10.

If the reflecting surface 6 is flat, $f\theta$ error and aberration, such as the curvature of image field, occur inevitably in the scanning light beam. Therefore, the optical scanning system 5 needs means for correcting the $f\theta$ error and the aberration.

FIG. 14 shows an optical scanning system incorporating improvements for correcting $f\theta$ error and aberration disclosed in Japanese Patent Laid-open No. 62-138823. Referring to FIG. 14, this known optical scanning system 41 has a polygonal rotating mirror 42 attached to the output shaft of a motor, not shown, and disposed so that its reflecting surfaces move across a narrow light beam, and an aspherical lens 44, i.e., a correcting optical element, disposed on the optical path of the reflected light beam between the polygonal rotating mirror 42 and a target surface 43. As shown in FIG. 14, the aspherical lens 44 has a substantially W-shaped light receiving surface and a convex light emitting surface.

The aspherical lens 44 corrects the $f\theta$ error and curvature of image field of the scanning light beam reflected by the reflecting surface of the polygonal rotating mirror 42 and focuses the scanning light beam on the target surface 43.

OBJECT AND SUMMARY OF THE INVENTION

It is a first object of the present invention to provide an optical scanning system of a simple, compact construction comprising: a motor having a space for containing parts; and a light deflecting member attached to the output shaft of the motor; characterized in that an optical path extends through the output shaft of the motor between a semiconductor laser and the light deflecting member, and at least a collimator lens is provided in the space for containing parts of the motor.

A second object of the present invention is to dispose the light deflecting member with its center of rotation in alignment with the optical axis of the semiconductor laser.

A third object of the present invention is to provide an optical scanning system employing a light deflecting member, and capable of preventing the change of the direction of travel of a reflected light beam even if the angular position of the light deflecting member varies due to errors introduced into the parts during manufacture and of preventing the deviation of the scanning light beam in the direction of feed due to the misalignment of the light deflecting member.

A fourth object of the present invention is to provide a compact, lightweight optical scanning system comprising: a light deflecting member; and a meniscus lens having a concave surface having a large curvature disposed close to the light deflecting member to limit the curvature of image field of the scanning light beam to a very small degree.

A fifth object of the present invention is to provide an optical scanning system of a simple construction employing a meniscus lens having a convex surface and a concave surface of a curvature substantially equal to that of the convex surface to limit the curvature of image field of the scanning light beam to a very small degree.

DESCRIPTION OF THE PREFERRED EMBODIMENTS

Figure 1:
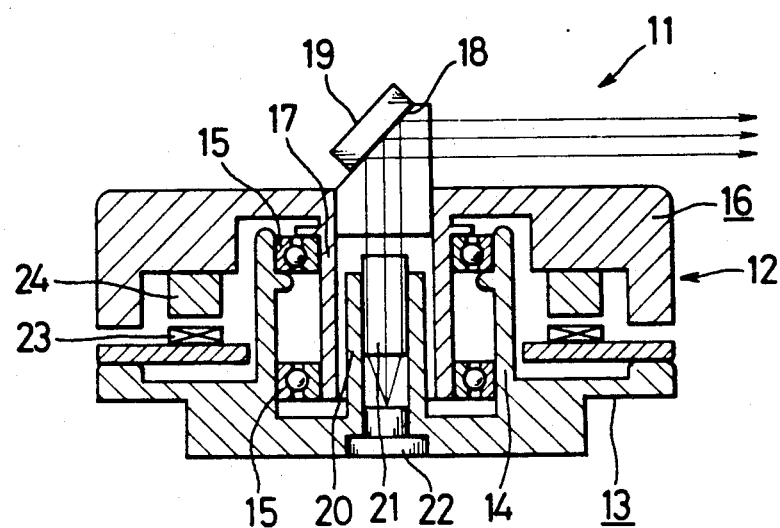
FIG. 1 is a longitudinal sectional view of an optical scanning system in a first embodiment according to the present invention.
Figure 2:
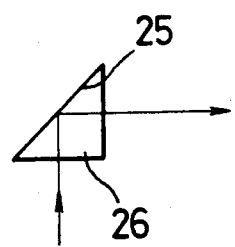
FIG. 2 is a side view of an essential portion of a modification of the optical scanning system of FIG. 1.
Figure 3:
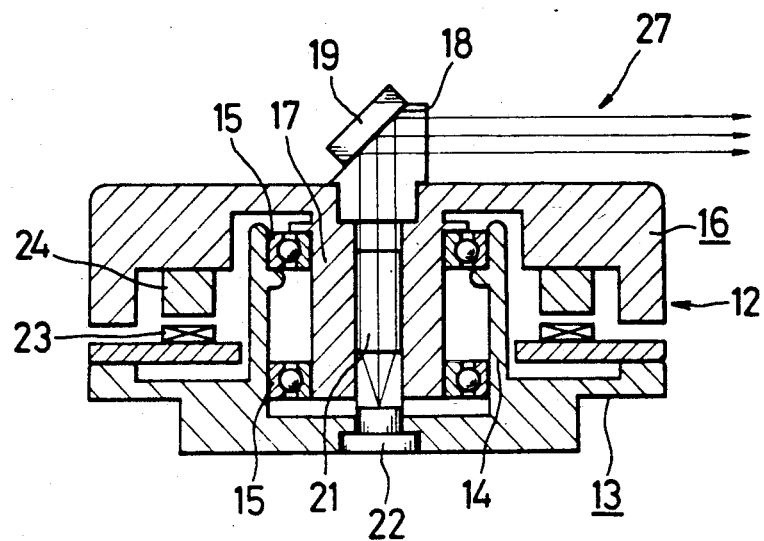
FIG. 3 is a longitudinal sectional view of another modification of the optical scanning system of FIG. 1.
Figure 4:
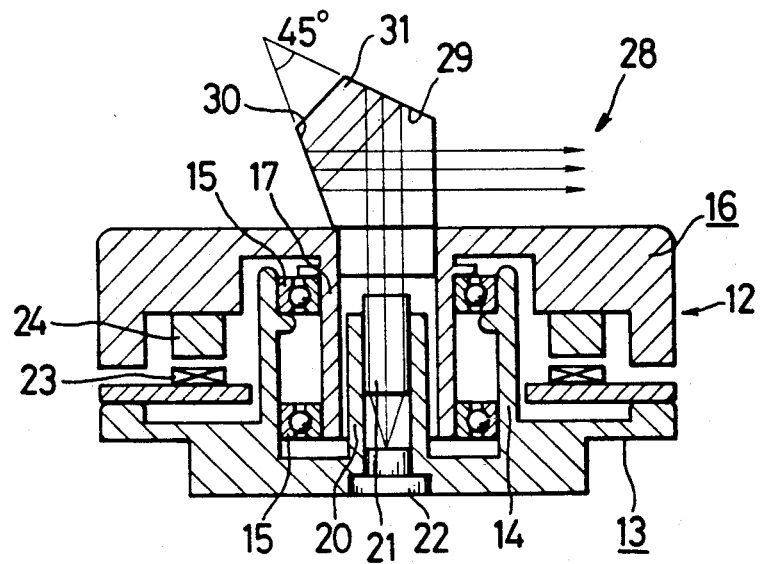
FIG. 4 is a longitudinal sectional view of an optical scanning system in a second embodiment according to the present invention.

An optical scanning system in a first embodiment according to the present invention will be described hereinafter with reference to FIGS. 1 to 3. An optical scanning system 11 is provided with a motor 12 comprising a stator 13 having a boss 14, a rotor 16 supported for rotation by bearings 15 on the boss 14 of the stator 13. The rotor 16 has a hollow output shaft 17 internally defining a space for containing parts. A reflecting mirror 19, i.e., a light deflecting member, having a reflecting surface 18 inclined at an angle of 45° to the center of rotation is attached to the upper end of the output shaft 17. A lens barrel 20 is set upright on the bottom of the stator 13 so as to extend in the bore of the output shaft 17. A collimator lens 21 is attached to the upper end of the lens barrel 20, and a semiconductor laser 22 is attached to the lower end of the lens barrel 20. Coils 23 are provided on the flange of the stator 13, and magnets 24 are attached to the inner surface of the rotor 16 opposite to the coils 23.

The rotor 16 holding the reflecting mirror 19 is rotated by magnetic motive force generated by the interaction between the coils 23 and the magnets 24. Laser light rays emitted by the semiconductor laser 22 are collimated by the collimator lens 21 to produce a scanning laser light beam. The scanning laser light beam falls on the rotating reflecting surface 18 of the reflecting mirror 19 and is deflected to sweep a target surface for scanning. Since the center of rotation of the reflecting mirror 19 and the optical axis of the semiconductor laser 22 are aligned, the scanning laser light beam is not deflected in the feed direction. Since the optical path between the semiconductor laser 22 and the reflecting mirror 19 extends within the output shaft 17 of the motor 12, the optical scanning system 11 can be constructed in a very compact construction.

In a modification, the reflecting mirror 19 of the optical scanning system may be substituted by a prism 26 (FIG. 2) having a reflecting surface 25 inclined at an angle of 45° to the optical path.

Although the collimator lens 21 of the optical scanning system 11 in this embodiment is disposed between the semiconductor laser 22 and the reflecting mirror 19 and is fixed to the lens barrel 20 set upright on the stator 13 so as to extend within the output shaft 17 of the motor 12, the present invention is not limited to such a construction. An optical scanning system 27 in a modification of the optical scanning system 11 may be provided with the collimator lens 21 provided within the bore of the output shaft 17 of the rotor 16 of the motor 12 and attached directly to the output shaft 17. The optical scanning system 27 need not be provided with the lens barrel 20 and is simpler in construction, more compact and lighter than the optical scanning system 11.

An optical scanning system 28 in a second embodiment according to the present invention will be described hereinafter with reference to FIGS. 4, 5, 6(a), 6(b) and 6(c). The optical scanning system 28 comprises a motor 12 having a stator 13 and a rotor 16, a pentaprism 31 having two reflecting surfaces 29 and 30 including an angle of 45° and attached to the upper surface of the rotor 16 of the motor 12, a semiconductor laser 22 provided on the bottom of the stator 13, a lens barrel 20 set upright on the stator 13, and a collimator lens 21 fitted in a lens barrel 20. Laser light rays emitted by the semiconductor laser 22 are collimated in a scanning laser beam by the collimator lens 21, the scanning laser beam falls on the pentaprism 31 rotating together with the rotor 16. Then, the scanning laser beam is reflected sequentially by the reflecting surfaces 29 and 30 of the pentaprism 31 so as to sweep a target surface for scanning.

Figure 5:
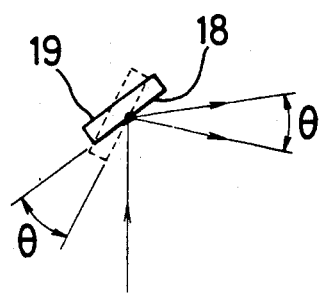
FIGS. 5, 6(a), 6(b) and 6(c) are diagrams of assistance in explaining optical characteristics.
Figure 6A:
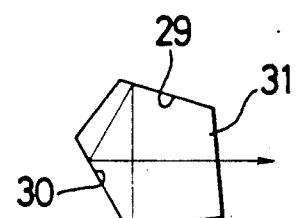
Figure 6B:
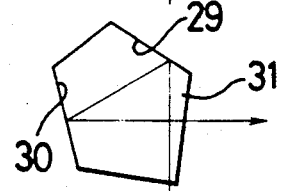
Figure 6C:
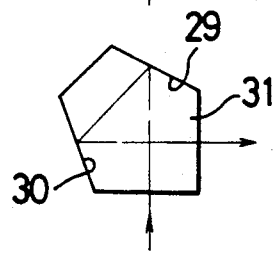

Although the direction of travel of the scanning laser beam reflected by the reflecting mirror 19 of the optical scanning system 11 in the first embodiment varies as shown in FIG. 5 when the inclination of the reflecting mirror 19 with respect to the optical path varies due to the runout of the rotor 16, the direction of travel of the scanning laser beam reflected by the two reflecting surfaces 29 and 30 of the pentaprism 31 of the optical scanning system 28 in the second embodiment remains constant as shown in FIGS. 6(a), 6(b) and 6(c) even if the angular position of the pentaprism 31 varies. Furthermore, the direction of travel of the scanning laser beam reflected through an angle of 90° by the two reflecting surfaces 29 and 30 of the pentaprism 31 is not deviated in the feed direction by the tilt of the pentaprism 31. Accordingly, the optical scanning system 28 executes scanning operation by using a scanning laser beam having satisfactory optical system, and the scanning laser beam remains stable regardless of the runout of the rotor 16.

The pentaprism 31 having the two reflecting surfaces 29 and 30 including an angle of 45° employed in the optical scanning system 28 may be substituted by two reflecting mirrors disposed so as to include an angle of 45°.

Figure 7:
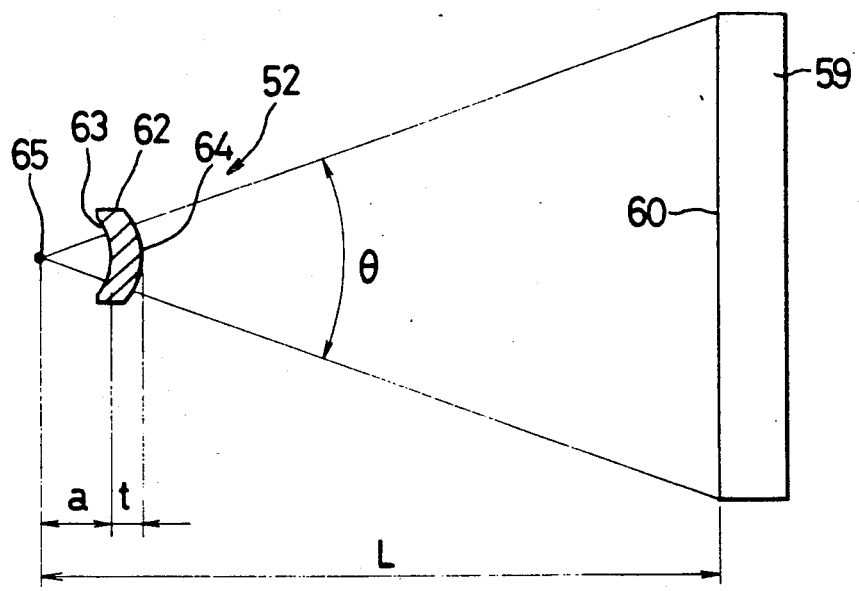
FIG. 7 is a plan view of an optical scanning system in a third embodiment according to the present invention.
Figure 8:
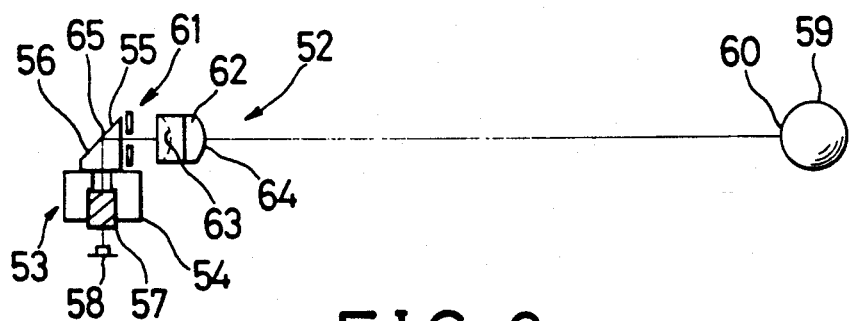
FIG. 8 is a longitudinal sectional view of the optical scanning system of FIG. 7.
Figure 9:
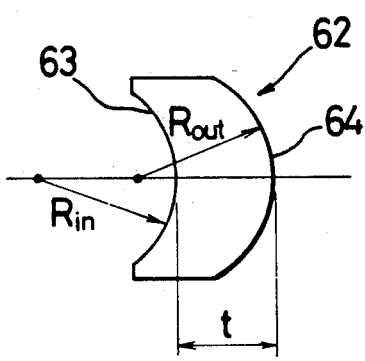
FIG. 9 is a plan view of an essential portion of the optical scanning system of FIG. 7.
Figure 10:
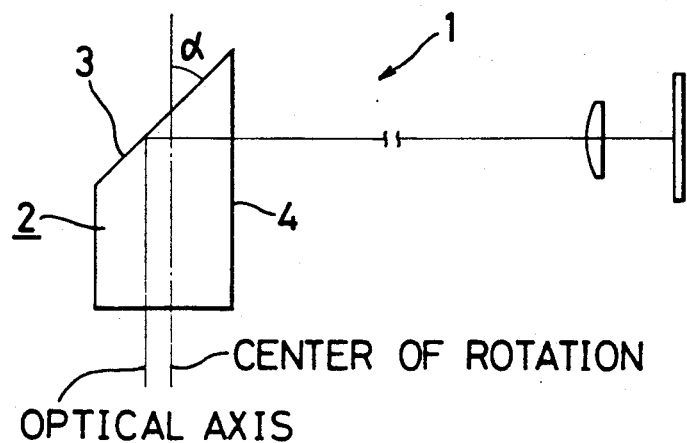
FIG. 10 is a side view of a first conventional optical system.
Figure 11:
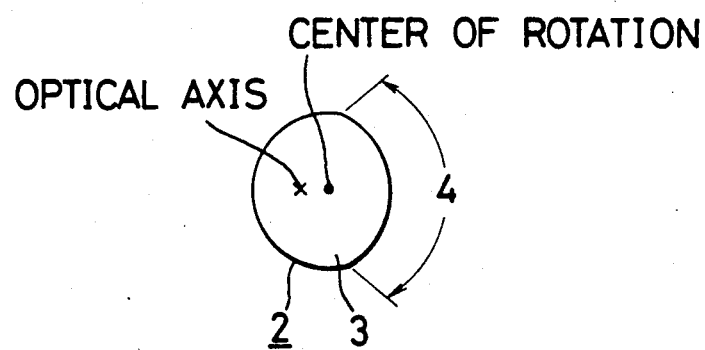
FIG. 11 is a plan view of the conventional optical system of FIG. 10.
Figure 12:
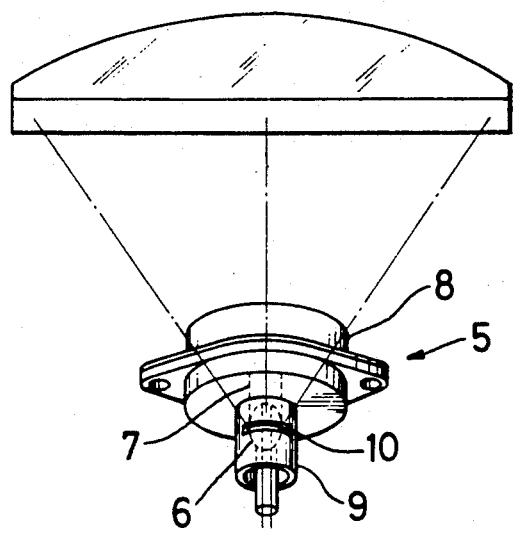
FIG. 12 is a perspective view of a second conventional optical system.
Figure 13:
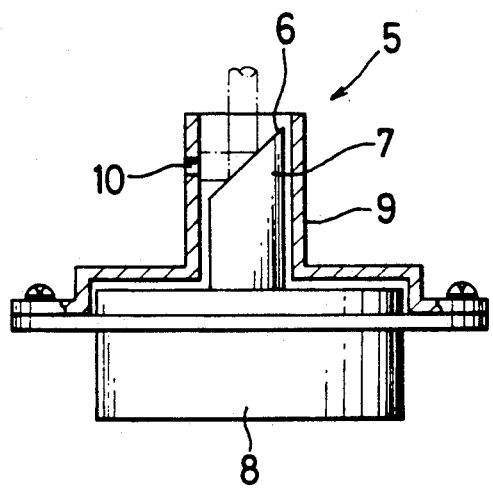
FIG. 13 is a longitudinal sectional view of the conventional optical scanning system of FIG. 12.
Figure 14:
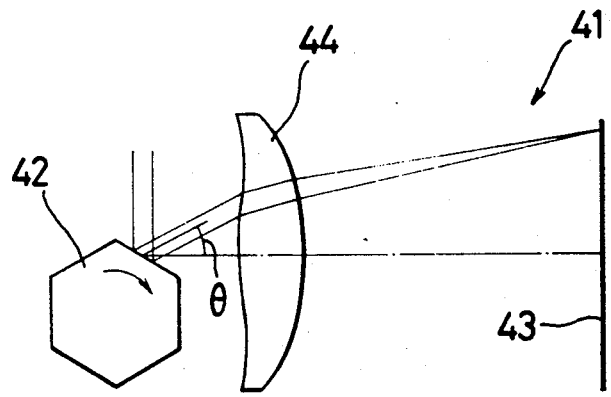
FIG. 14 is a side view of a third conventional optical scanning system.

An optical scanning system 52 in a third embodiment according to the present invention will be described hereinafter with reference to FIGS. 7 to 9. As shown in FIG. 8, the optical scanning system 52 comprises a motor 53 having a rotor 54 provided with a bore, a prism 55 having a reflecting surface 56 inclined at an angle of 45° to the center of rotation of the rotor 54 and attached to the upper surface of the rotor 54, a collimator lens 57 fitted in the bore of the rotor 54, a semiconductor laser 58 disposed opposite to the collimator lens 57, an aperture 61, and a meniscus lens 62, i.e., a correcting optical means. The aperture 61 and the meniscus lens 62 are arranged in that order on a scanning optical path between the reflecting surface 56 of the prism 55 and a circumference 60, i.e., a target surface, of a photoconductive drum 59. As shown in FIG. 9, the meniscus lens 62 has a concave surface 63 of a radius $R_{in}$ of curvature on which the laser light beam falls and a convex surface 64 of a radius $R_{out}$ of curvature from which the laser light beam emerges. The radii $R_{in}$ and $R_{out}$ meet the following relation:

$$0.9 \leq R_{in}/R_{out} < 1.1$$

The meniscus lens 62 has a focal length λ of 780 mm and is formed of BK-7 having a refractive index n of 1.51143. As shown in FIG. 7, the distance between the optical center of the concave surface 63 of a radius $R_{in}$ of curvature in the range of 8 to 20 mm and a reflection point 65 on the reflecting surface 56 of the prism 55 is in the range of 5 to 10 mm.

The collimator lens 57 collimates rays of laser light emitted by the semiconductor laser 58 in a laser light beam, the reflecting surface 56 of the prism 55 rotating together with the rotor 54 of the motor 53 reflects the laser light beam for scanning, and the aperture 61 limits the sweep angle θ of the scanning laser light beam and shapes the scanning laser light beam. Then, the meniscus lens 62 corrects the curvature of image field before the scanning laser light beam sweeps the target surface 60 of the photoconductive drum 59 for scanning.

The disposition of the meniscus lens 62 having the concave surface 63 and the convex surface 64, which are substantially the same in radius of curvature and have comparatively large curvatures, close to the prism 55 enables the optical scanning system 52 comprising the motor 53 and the meniscus lens 62 to be constructed in a very compact construction, limits the curvature of image field to a very small degree and provides the optical scanning system with satisfactory optical characteristics.

The optical characteristics of the optical scanning system 52 were evaluated in terms of curvature of image field with respect to a scanning direction and curvature of image field with respect to a feed direction as evaluation functions, and values of the parameters that make the curvatures of image field with respect to a scanning direction and with respect to a feed direction approach infinitesimals were determined through simulation. The results of simulation are shown in Tables 1 and 2, in which t (mm) is the thickness of the meniscus lens 62 along the optical axis, θ (degree) is scanning angle, $R_{in}$ (mm) is the radius of curvature of the concave surface 63 of the meniscus lens 62, $R_{out}$ (mm) is the radius of curvature of the convex surface 64 of the meniscus lens 62, a (mm) is the distance between the reflecting point 65 and the optical center of the concave surface 63 of the meniscus lens 62, and L is the distance between the reflecting point 65 and the target surface 60.

Results of simulation using the meniscus lens 62 having the concave surface 63 and the convex surface 64 having the same radius R of curvature are shown in Table 2.

As is obvious from Tables 1 and 2, the use of the meniscus lens 62 having the concave surface 63 having a large radius of curvature in the range of 8 to 20 mm, meeting the relation between the radius $R_{in}$ of curvature of the concave surface 63 and the radius $R_{out}$ of curvature of the convex surface 64, the same expressed by: $0.9 \leq R_{in}/R_{out} < 1.1$, and disposed close to the prism 55 so that the distance between the reflecting point 65 on the reflecting surface 56 of the prism 55 and the optical center of the concave surface 63 is in the range of 5 to 10 mm, limits curvatures of image field with respect to the scanning direction and with respect to the feed direction to a very small degree.

Thus, the optical scanning system 52 scans the target surface 60 of the photoconductive drum 59 by the scanning laser light beam having satisfactory optical characteristics and a minute curvature of image field good print quality. The fθ error in the operation of the optical scanning system 52 can readily be corrected by controlling the timing of driving the semiconductor laser 58 without requiring optical correction.

Since the comparatively small meniscus lens 62 having a large radius of curvature is disposed close to the prism 55, the optical scanning system 52 comprising the motor 53 and the meniscus lens 62 can be constructed in a compact, lightweight construction, and the parts can easily be assembled in a unit, which improves the productivity of a production line for producing an equipment incorporating the optical scanning system 52.

In this embodiment, the laser light beam emitted by the semiconductor laser 58, having a vertical divergence ratio and a horizontal divergence ratio which is different from the vertical divergence ratio is shaped by the aperture 61. In a modification, a cylindrical lens may be employed to shape the laser light beam by the refractive function of the cylindrical lens to improve the light intensity distribution of the laser light beam. When a cylindrical lens is employed for beam shaping, an aperture having a large NA (numerical aperture) to screen stray light so that the stray light may not interfere with the scanning light beam. Furthermore, it is possible to provide the optical scanning system 52 with, for example, a polygonal rotating mirror of dimensions corresponding to the foregoing dimensions instead of the prism 55.

TABLE 1

| No. | t | a | L | θ | $R_{in}$ | $R_{out}$ | fθ Error | Curvature of Image Field Scanning | Feed |
|-----|---|---|---|---|----------|-----------|----------|-----------------------------------|------|
| 1 | 3 | 7.117 | 189.729 | 70 | 9.424 | 9.379 | −4.384 | −0.160 | −0.107 |
| 2 | 4 | 7.859 | 194.881 | 70 | 10.935 | 10.868 | −4.203 | 0.171 | −0.300 |

TABLE 1-continued

| No. | t | a | L | θ | $R_{in}$ | $R_{out}$ | fθ Error | Curvature of Image Field Scanning | Feed |
|---|---|---|---|---|---|---|---|---|---|
| 3 | 5 | 8.421 | 199.480 | 70 | 12.257 | 12.171 | −4.045 | 0.167 | −0.287 |
| 4 | 6 | 8.871 | 203.660 | 70 | 13.467 | 13.360 | −3.903 | 0.173 | −0.293 |
| 5 | 8 | 9.485 | 211.254 | 70 | 15.569 | 15.436 | −3.650 | 0.160 | −0.238 |
| 6 | 9 | 9.663 | 214.826 | 70 | 16.463 | 16.338 | −3.534 | 0.136 | −0.155 |
| 7 | 10 | 9.796 | 218.247 | 70 | 17.303 | 17.188 | −3.423 | 0.126 | −0.101 |
| 8 | 12 | 9.880 | 224.931 | 70 | 18.721 | 18.684 | −3.211 | −0.209 | 0.211 |
| 9 | 5 | 6.568 | 150.931 | 90 | 10.340 | 10.298 | −6.536 | −0.187 | 0.234 |

TABLE 2

| No. | t | a | L | θ | R | fθ Error | Curvature of Image Field Scanning | Feed |
|---|---|---|---|---|---|---|---|---|
| 1 | 4 | 6.943 | 190.046 | 70 | 9.195 | −4.375 | −0.137 | 0.208 |
| 2 | 5 | 8.179 | 199.971 | 70 | 11.910 | −4.032 | −0.108 | 0.285 |
| 3 | 10 | 9.585 | 218.773 | 70 | 16.957 | — | −0.192 | 0.380 |

What is claimed is:

1. An optical scanning system comprising: a motor having an output shaft; a light deflecting member attached to the output shaft of said motor; a semiconductor laser; and a collimator lens disposed between said light deflecting member and said semiconductor laser with its optical axis in alignment with the optical axis of said semiconductor laser; wherein a space for containing parts is formed in the output shaft of said motor, said light deflecting member is attached to one end of the output shaft of said motor, an optical path extends through the space formed in the output shaft of said motor between said semiconductor laser and said light deflecting member, and said collimator lens is disposed in the space formed in the output shaft of said motor; and wherein said light deflecting member attached to the output shaft of said motor is disposed on the optical axis of said semiconductor laser after said collimator lens with respect to the direction of travel of a laser light beam emitted by said semiconductor laser, said light deflecting member has at least one flat reflecting surface, a correcting optical system is provided on an optical path between the flat reflecting surface of said light deflecting member and a target surface to be scanned, and the correcting optical system comprises a meniscus lens having a concave surface of a radius of curvature in the range of 8 to 20 mm and disposed with the concave surface facing the light deflecting member so that the distance between the reflecting point of said light deflecting member and the optical center of the concave surface is in the range of 5 to 10 mm.

2. An optical scanning system according to claim 1, wherein the output shaft of said motor is a hollow shaft forming the space for containing parts.

3. An optical scanning system according to claim 1, wherein the meniscus lens meets a relation represented by:

$$0.9 \leq R_{in}/R_{out} < 1.1$$

where $R_{in}$ is the radius of curvature of the concave surface of the meniscus lens, and $R_{out}$ is the radius of curvature of the convex surface of the meniscus lens.

4. An optical scanning system comprising:
a motor having an output shaft;
a light deflecting member attached to the output shaft of said motor;
a laser;
a collimator lens disposed between said light deflecting member and said laser, said collimator lens having an optical axis in alignment with an optical axis of the laser;
wherein a space for containing parts is formed in the output shaft of the motor, with said light deflecting member attached to one end of the output shaft of said motor, such that an optical path extends through the space formed in the output shaft of said motor between the laser and the light deflecting member; and
wherein said collimator lens is connected to a stator of said motor and at least partially extends into said space formed in the output shaft of said motor.

5. The optical scanning system of claim 4, wherein a lens barrel is connected to the stator to extend into the space formed in the output shaft, and wherein said collimator lens is attached to an upper end of the lens barrel.

6. The optical scanning system of claim 4, wherein said light deflecting member includes two reflecting surfaces formed to include an angle of 45°.

7. An optical scanning system comprising:
a motor having an output shaft;
a light deflecting member attached to the output shaft of said motor;
a laser;
a collimator lens disposed between said light deflecting member and said laser having an optical axis in alignment with the optical axis of the laser;
wherein a space is formed in the output shaft of the motor with the light deflecting member attached to one end of the output shaft of the motor such that an optical path extends through the space formed in the output shaft of the motor between the laser and the light deflecting member; and
wherein said motor includes a stator having a surface which extends substantially perpendicular to an axis of rotation of said output shaft, said surface having one of a magnet and a coil thereon, said motor further including a rotor which includes a surface extending substantially perpendicular to the axis of rotation of said output shaft, wherein said rotor is connected to said output shaft, and wherein said surface of the rotor includes one of a magnet and a coil opposed to the said one of a magnet and a coil disposed on the stator to thereby produce electromechanical force for rotating said rotor and said output shaft;
said scanning system further including a support member connected to the stator and extending substantially parallel to the axis of rotation of said output shaft, said support member extending interiorly of said one of a magnet and a coil of said stator, and interiorly of said one of a magnet and a coil of said rotor, and wherein at least one bearing is provided between the output shaft and said support member such that said output shaft is supported for rotation by said support member.

8. The optical scanning system of claim 7, further including a lens barrel connected to said stator and extending upwardly into the space formed in said output shaft, and wherein said collimator lens is attached to said lens barrel.

9. The optical scanning system of claim 7, wherein said light deflecting member includes two reflecting surfaces formed so as to include an angle of 45°.

* * * * *